Apr. 17, 1923. 1,451,732
G. HIPWOOD
FISH ROD HOLDER
Filed Feb. 10, 1921
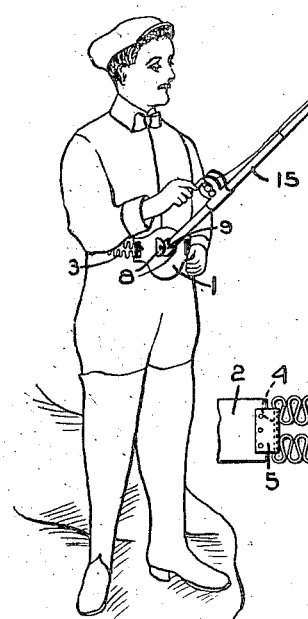
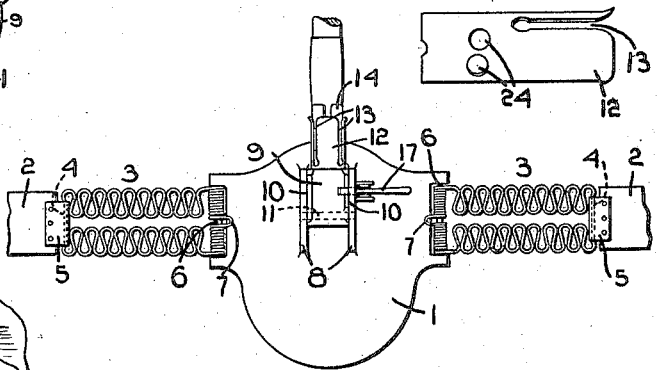
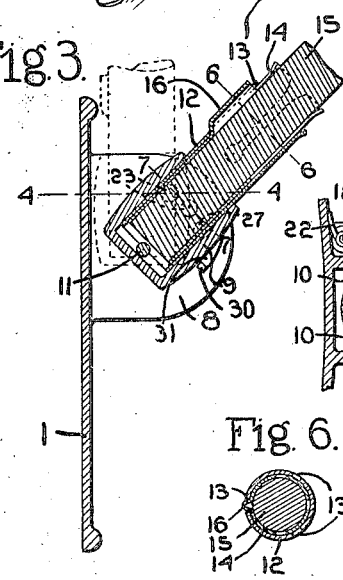
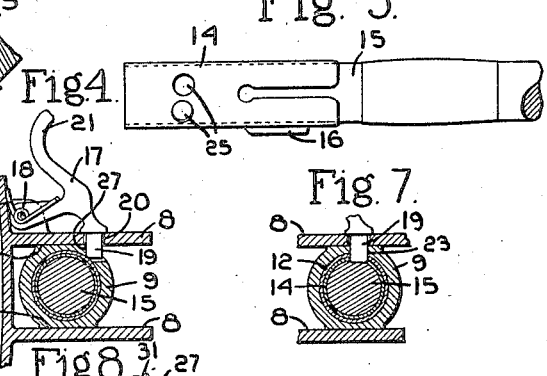
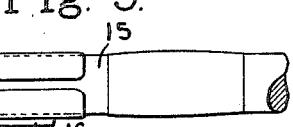
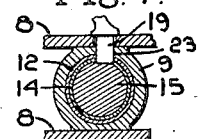
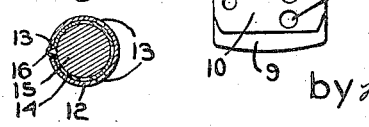
Inventor.
George Hipwood
by Heard Smith & Tennant.
Attys.

Patented Apr. 17, 1923.

1,451,732

UNITED STATES PATENT OFFICE.

GEORGE HIPWOOD, OF NEW YORK, N. Y., ASSIGNOR TO FRANCIS C. MAYLE, OF NIAGARA FALLS, NEW YORK.

FISH-ROD HOLDER.

Application filed February 10, 1921. Serial No. 444,031.

*To all whom it may concern:*

Be it known that I, GEORGE HIPWOOD, a citizen of the United States, and residing at New York, county of New York, State of New York, have invented an Improvement in Fish-Rod Holders, of which the following description, in connection with the accompanying drawing, is a specification, like characters on the drawing representing like parts.

This invention relates to fish rod holders and has for its object to improve the fish rod holder illustrated in my United States Patent No. 1,174,319, March 7, 1916.

These improvements have for their object to provide a fish rod holder which is more comfortable for the user to wear, which is constructed so that the socket member will be more firmly connected to the supporting plate, and which has other features of importance all which will be more fully hereinafter set forth.

In order to give an understanding of my invention I have illustrated in the drawings a selected embodiment thereof, which will now be described, after which the novel features will be pointed out in the appended claims.

Fig. 1 is a perspective view showing the manner in which my improved fish holder may be used.

Fig. 2 is a front view of the supporting plate showing the manner of connecting it to the belt.

Fig. 3 is an enlarged sectional view taken vertically through the holder.

Fig. 4 is a section on the line 4—4, Fig. 3.

Fig. 5 is a view of the end of the fish pole showing the inner sleeve thereon.

Fig. 6 is a section on the line 6—6, Fig. 3.

Fig. 7 is a section on line 7—7, Fig. 3.

Fig. 8 is a side view of the socket member.

Fig. 9 is a side view of the outer sleeve.

My improved fish rod holder is similar in some respects to that shown in my above mentioned Patent No. 1,174,319 in that it comprises a body portion or plate which rests against the body of the fisherman and is held in place by a belt, and a socket member pivoted to the body member and constructed to receive the fish pole.

The body portion in the present invention is in the form of a plate 1, which is of sufficient dimensions both transversely and vertically so that it will have a comfortable bearing on the body of the wearer. This plate 1 is secured to the body by means of a belt 2 which has a special flexible connection with the plate so that the fisherman can readily move his body into different positions without being hampered by a stiff belt. The main body of the belt 2 may be of canvas, leather or any other suitable material and each end of the belt is connected to the plate by means of a special flexible connection 3. This flexible connection comprises a piece of resilient wire bent as shown so that it has a zig-zag formation. Each flexible connection comprises two portions each of which has a length of wire with this zig-zag formation and the two portions are connected at one end as shown at 4, said portion 4 constituting a bridge portion to which the belt is pivotally connected by means of the loop 5. At the other end of the flexible connection the wire of each zig-zag portion is coiled about a pin 6 carried by the plate 1.

The end of the wire is bent to form an extending finger portion 7 which acts as a stop, and by its engagement with the plate limits the swinging movement of the flexible portion in one direction. These flexible portions 3 are extensible and also are flexible in a vertical as well as a transverse direction so that they do not hamper in any way the bending or other movements of the wearer.

The supporting plate 1 is provided with two parallel flanges 8 which project from the front thereof and between which the socket member, indicated at 9, is pivoted. The socket member is provided with the flat sides 10 which engage the inner faces of the flanges 8 and by this construction the socket member is firmly held in proper position while being permitted to swing in a vertical plane. Any suitable means for pivoting the socket member to the plate may be employed. I have herein shown a pivot pin 11 which extends through the flanges 8 and through the lower end of the socket member.

The socket member receives a sleeve 12 of relatively thin stock, said sleeve projecting beyond the socket member and having its projecting end slotted as shown at 13. This outer sleeve 12 receives an inner sleeve 14 which fits tightly over the end of the fish rod 15. The inner sleeve 14 is provided with a rib 16 which is adapted to enter one of the slots 13 in the outer sleeve, the engagement of said rib in the slot serving to hold the inner sleeve from turning, and since the inner sleeve tightly fits the fish rod this construction will also hold the fish rod from turning.

It is expected that this inner sleeve 14 will be permanently retained on the fish rod and so that when the fish rod is to be removed from the holder the inner sleeve 14 will be withdrawn from the outer sleeve 12.

The socket member 9 is capable of swinging about its pivot 11 from the inclined position shown in full lines Fig. 3 to the vertical position shown in dotted lines and I have provided novel means for locking said socket member in either of these two positions and also in intermediate positions. This locking device comprises a locking latch 17 which is pivoted at 18 to the plate 1 and is provided with a nose 19 that operates in an opening 20 formed in one of the flanges 8. This locking device is also provided with a thumb piece 21 by which it may be operated and it is acted upon by a spring 22 which tends to throw it into operative position.

The socket member 9 is provided with a plurality of recesses 23 into any one of which the nose 19 may be received depending on the angular position of the socket member. The engagement between the nose and the recesses serve to lock the socket member in any inclined position.

I have provided herein a construction wherein this same locking means may be used for locking the outer sleeve to the socket member. For this purpose the outer sleeve is provided with apertures 24 which are aligned with the recesses or openings 23 and the nose 19 is long enough so that when the latch is in operative position said nose will pass through openings 23 and entering the openings 24 in the sleeve 12. If desired I may make the inner sleeve 14 with apertures 25 which are in alignment with the apertures 24 and the nose 19 may be made long enough to enter the apertures of the inner sleeve so that the latch not only serves to lock the socket member in its operative position but also serves to lock the outer sleeve to the socket and the inner sleeve to the outer sleeve.

This locking of the sleeves to the socket member applies only when the socket member is in an inclined position. The nose 19 is so positioned that when the socket member is in a vertical position said nose is at one side of the sleeves. The socket member has a recess 27 to receive the nose when in vertical position but the sleeves have no corresponding aperture, therefore the fish rod is free to be removed therefrom or replaced therein. One of the flanges 8 is provided with a stop lug 30 and the socket member is provided with a stop 31 which is adapted to engage the stop lug and thus limit the downward swinging movement of the socket.

By having the plate 1 of relatively large size a holder is provided which is extremely comfortable to wear and this comfort is augmented by employing the flexible connections 3. The improved construction of socket is advantageous because it holds the socket member rigidly in place.

I claim:

1. In a fish rod holder, the combination with a supporting plate and means to attach said plate to a person's body, of a socket member pivoted to said plate, a fish rod having a sleeve applied to the handle thereof, which sleeve fits into said socket, and a locking latch pivoted to the plate and adapted to lock both the socket in adjusted position and the sleeve in the socket.

2. In a fish rod holder, the combination with a plate, of a wire connection secured to each side of the plate and comprising resilient wire bent into zigzag formation whereby the connection is extensible and also flexible in a vertical direction, a belt encircling the body of the wearer and connected to said flexible connections, and a socket member pivoted to the plate and adapted to support a fish rod.

3. In a fish rod holder, the combination with a plate, of a belt connected thereto for securing the plate to a person's body, said plate having two flanges extending therefrom, a socket member situated between said flanges and pivoted thereto, said socket member having flat sides engaging the flanges and also having a plurality of recesses and a locking latch pivoted to the plate and operating through one of said flanges and adapted to enter any one of said recesses thereby to lock the socket member in adjusted position, said socket member being adapted to support a fish rod.

4. In a fish rod holder, the combination with a supporting plate and means to attach said plate to a person's body, of a socket member pivoted to said plate, a fish rod having a sleeve applied to the handle thereof, which sleeve fits into said socket, and a locking latch constructed to lock the socket in adjusted position and also to lock the sleeve in the socket.

In testimony whereof, I have signed my name to this specification.

GEORGE HIPWOOD.